(12) United States Patent
Zhang et al.

(10) Patent No.: US 8,369,851 B2
(45) Date of Patent: Feb. 5, 2013

(54) MOBILITY MANAGEMENT ENTITY INFORMATION DELETING METHOD AND DEVICE

(75) Inventors: Yanping Zhang, Shanghai (CN); Weihua Hu, Shanghai (CN); Han Zhou, Shanghai (CN); Zhongping Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/212,728

(22) Filed: Aug. 18, 2011

(65) Prior Publication Data

US 2011/0300861 A1  Dec. 8, 2011

Related U.S. Application Data

(63) Continuation of application No. 12/783,359, filed on May 19, 2010, which is a continuation of application No. PCT/CN2008/073364, filed on Dec. 5, 2008.

(30) Foreign Application Priority Data

Feb. 4, 2008  (CN) .......................... 2008 1 0006212

(51) Int. Cl.
    *H04W 4/00*    (2009.01)
(52) U.S. Cl. .................. 455/433; 455/432.1; 455/456.1; 370/328; 370/338
(58) Field of Classification Search ....... 455/432.1–436, 455/456.1–457; 370/328–338
    See application file for complete search history.

(56) References Cited

U.S. PATENT DOCUMENTS

| | | | |
|---|---|---|---|
| 2003/0012155 A1* | 1/2003 | Sayeedi | ......................... 370/328 |
| 2007/0032243 A1 | 2/2007 | Muller | |
| 2007/0248064 A1 | 10/2007 | Shaheen | |
| 2008/0014930 A1* | 1/2008 | Jokinen et al. | ............. 455/432.3 |
| 2009/0052384 A1* | 2/2009 | Zisimopoulous et al. | .... 370/329 |
| 2010/0267388 A1* | 10/2010 | Olsson | ......................... 455/436 |
| 2010/0296453 A1* | 11/2010 | Grahn et al. | .................. 370/328 |

FOREIGN PATENT DOCUMENTS

| | | |
|---|---|---|
| CN | 1595863 A | 3/2005 |
| CN | 1650660 A | 8/2005 |
| CN | 1816036 A | 8/2006 |

(Continued)

OTHER PUBLICATIONS

State Intellectual Property Office of the People's Republic of China, International Search Report in International Patent Application No. PCT/CN2008/073364 (Mar. 12, 2009).

(Continued)

*Primary Examiner* — Chuong A Ngo
(74) *Attorney, Agent, or Firm* — Leydig, Voit & Mayer, Ltd.

(57) ABSTRACT

A mobility management entity (MME) information deleting method includes: receiving a message sent by a first MME; and if needed, determining whether it is necessary to delete information about the first MME according to version information about the first MME. The method further includes: receiving a message sent by a target MME, in which the message carries version information about a source MME acquired by the target MME or an indication of deleting information about the source MME added by the target MME; and deleting the information about the source MME according to the message. A network device for deleting MME information is also provided. According to the present invention, a network device, such as a home subscriber server (HSS), is capable of acquiring version information about a source MME or receiving an indication of deleting information about the source MME, so as to determine whether it is necessary to delete the information about the MME.

15 Claims, 9 Drawing Sheets

FOREIGN PATENT DOCUMENTS

| | | | |
|---|---|---|---|
| CN | 1852143 | A | 10/2006 |
| CN | 101064935 | A | 10/2007 |
| CN | 101072111 | A | 11/2007 |
| CN | 101247638 | A | 8/2008 |
| WO | WO 98/59505 | A1 | 12/1998 |
| WO | WO 00/02350 | A1 | 1/2000 |
| WO | WO 2007/144762 | A2 | 12/2007 |
| WO | WO 2008/101431 | A1 | 8/2008 |

OTHER PUBLICATIONS

State Intellectual Property Office of the People's Republic of China, Office Action in Chinese Patent Application No. 200810006212.5 (Jan. 27, 2010).

3GPP TS 23.401, "Technical Specification Group Services and System Aspects; General Packet Radio Service (GPRS) enhancements for Evolved Universal Terrestrial Radio Access Network (E-UTRAN) access (Release 8)," Dec. 2007, 3$^{rd}$ Generation Partnership Project, Valbonne, France.

Extended European Search Report in corresponding European Patent Application No. 08872257.4 (Oct. 5, 2010).

Written Opinion of the International Searching Authority in corresponding European Patent Application No. PCT/CN2008/073364 (Mar. 12, 2009).

1$^{st}$ Office Action in corresponding European Application No. 08872257.4 (Jul. 15, 2011).

U.S. Appl. No. 12/783,359.

2$^{nd}$ Office Action in corresponding European Application No. 08872257.4 (Feb. 7, 2012).

Extended European Search Report in corresponding European Application No. 11182836.4 (Oct. 27, 2011).

"TD S2-074401—Idle State Signalling Reduction," 3GPP TSG SA WG2 Meeting #60, Oct. 8-12, 2007, Nokia Siemens Networks, Kobe, Japan.

Office Action in corresponding European Patent Application No. 11182836.4 (Apr. 20, 2012).

* cited by examiner

MOBILITY MANAGEMENT ENTITY INFORMATION DELETING METHOD AND DEVICE

CROSS REFERENCE TO RELATED APPLICATIONS

This application is a continuation of U.S. patent application Ser. No. 12/783,359, filed on May 19, 2010, which is continuation of International Application No. PCT/CN2008/073364, filed on Dec. 5, 2008. The International Application claims priority to Chinese Patent Application No. 200810006212.5, filed on Feb. 4, 2008. The afore-mentioned patent applications are hereby incorporated by reference in their entireties.

FIELD OF THE INVENTION

The present invention relates to the field of network technology, and more particularly to a mobility management entity (MME) information deleting method and device.

BACKGROUND OF THE INVENTION

The core network of wireless evolution network mainly includes logic functional entities, such as mobility management entity (MME), serving system architecture evolution (SAE) gateway (S-GW), and packet data network (PDN) SAE gateway (P-GW). The MME is in charge of non-access stratum (NAS) signaling as well as the encryption, roaming, and tracking of the NAS signaling, the allocation of temporary user identities, and security functions, and is corresponding to a control plane of a serving GPRS support node (SGSN) in the existing Universal Mobile Telecommunications System (UMTS). The S-GW is in charge of local mobility anchor points and mobility anchor points in a 3GPP system as well as lawful interception of related information. The P-GW is in charge of policy enforcement and charging as well as lawful interception of related functions. The home subscriber server (HSS) is adapted to store user subscription information.

Currently, a double registration mechanism is widely applied in the art. According to the mechanism, in order to reduce the interaction of the MME and the HSS caused by the switching of user equipment (UE) between different radio access types (RATs), it is regulated that when the UE is switched between different RATs, the MME and the SGSN are both registered with the HSS, and the HSS saves information about the SGSN and the MME at the same time. Thereby, when the UE is switched between different RATs, the interaction of the MME/SGSN and the HSS is reduced, and the message load on the HSS is lowered.

However, the following problem has become apparent in the art.

Under the double registration mechanism, for some source MMEs of certain versions, the HSS may not delete registration information about the source MME after receiving an Update Location message. However, if the source MME is of some other specific versions, the HSS needs to delete registration information about the source MME, and send a message to notify the source MME to cancel its location registration information. Therefore, the HSS can only determine whether it is necessary to delete the information about the source MME after acquiring the version of the source MME. While in the conventional art, the HSS is unable to obtain the version of the MME, and thus fails to determine whether it is necessary to delete the information about the source MME.

SUMMARY OF THE INVENTION

The present invention provides a mobility management entity (MME) information deleting method and device, so as to enable a network device, for example, a home subscriber server (HSS), to determine whether it is necessary to delete information about an MME.

As a first aspect of the present invention an MME information deleting method is provided, which includes: detecting, by a home subscriber server, HSS, that a terminal moves from a source MME to a target MME;

determining, by the HSS, whether it is necessary to delete information about the source MME according to locally saved version information about the source MME.

In a particular implementation form according to the first aspect of the present invention the MME information deleting method includes: receiving, by a home subscriber server, HSS, a message sent by a target MME, the message carrying version information about a source MME or an indication of deleting information about the source MME; and determining, by the HSS, whether it is necessary to delete the information about the source MME according to the message sent by the target MME.

As a second aspect of the present invention a network device for deleting MME information is provided, which includes:

a unit, adapted to save version information about a source MME locally; and a first processing unit which is adapted to determine whether it is necessary to delete information about the source MME according to the version information about the source MME when it detects that a user terminal moves from the source MME to a target MME.

In a particular implementation form according to the second aspect of the present invention the network device for deleting MME information includes a second receiving unit and a second processing unit.

The second receiving unit is adapted to receive a message sent by a target MME. The message carries version information about a source MME or an indication of deleting information about the source MME.

The second processing unit is adapted to determine whether it is necessary to delete the information about the source MME according to the message sent by the target MME.

As a third aspect of the present invention an MME device is provided serving as a target MME, which includes an information acquisition unit and an information transmitting unit.

The information acquisition unit is adapted to acquire version information about a source MME or an indication of deleting information about the source MME.

The information transmitting unit is adapted to send the version information about the source MME acquired by the information acquisition unit, or the indication of deleting the information about the source MME acquired by the information acquisition unit to a home subscriber server, HSS.

The present invention has the following advantages.

Through the method that the MME initiatively provides its version information to the network side related device, such as the HSS, or transmits the version information about the source MME to the network side related device, such as the HSS, or transmits the indication of deleting the information about the source MME to the network side related device, such as the HSS, the network side related device, such as the HSS, is enabled to determine whether it is necessary to delete the information about the MME.

DETAILED DESCRIPTION OF THE EMBODIMENTS

In an embodiment, the present invention provides a method for deleting MME information with a network side related device, and the network side related device is, for example, an HSS. The HSS determines whether it is necessary to delete registration information about an MME according to acquired version information about the MME or a received indication. Specifically, the MME may be an SGSN or a source/target MME, in which the source MME is an MME where UE is located before a Tracking Area Update (TAU), a Routing Area Update (RAU), or an Attach process, and the target MME is an MME where the UE migrates during the TAU, RAU, or Attach process. Hereinafter, the implementation of an MME information deleting method according to an embodiment of the present invention is described in a particular application scenario.

Figure 1:
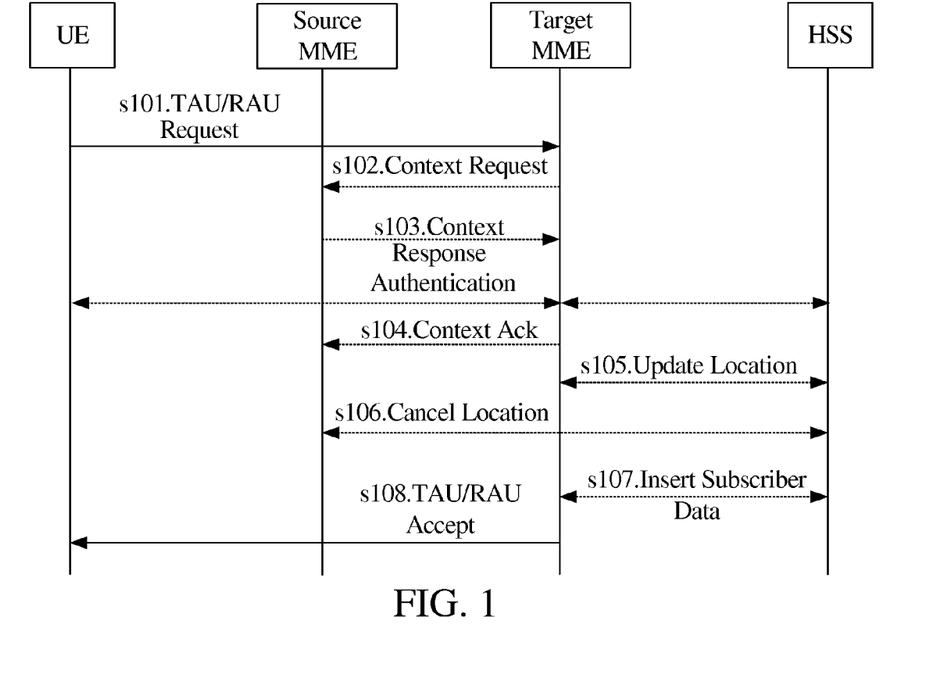
FIG. 1 is a flow chart of an MME information deleting method according to an embodiment of the present invention.

A first embodiment of the present invention provides an MME information deleting method. Referring to FIG. 1, a TAU/RAU process initiated by UE is implemented, which includes the following steps.

In Step s101, UE sends a TAU/RAU Request message to a target MME.

In Step s102, the target MME sends a Context Request message to a source MME to require context information about the UE.

In Step s103, the source MME sends a Context Response message to the target MME to return the context information about the UE.

In Step s104, the target MME sends a Context Ack message to the source MME.

In Step s105, the target MME sends an Update Location message to an HSS for registration, in which the message carries an international mobile subscriber identity (IMSI), version information about the MME, and an MME identity. The version information carried in the message indicates the HSS whether the version of the current target MME is Pre-Rel-8, or explicitly informs the HSS of the version information about the target MME itself, for example, Rel-8. The HSS may save the version information about the target MME in the message. If the message does not carry an indication of the version information about the entity, the HSS sets the version information about the target MME to Pre-Rel-8.

At some time thereafter, if the UE continuously moves from the target MME (for ease of illustration, referred to as MME B) to another new MME (for ease of illustration, referred to as MME C) and initiates an Attach or a TAU/RAU process, after receiving an Update Location message from the new target MME C, the HSS determines whether it is necessary to delete location registration information about the MME B (the new source MME) according to the locally saved version information about the source MME B and other information (for example, RAT), and if yes, the HSS sends a Cancel Location message to the MME B.

In Step s106, the HSS sends a Cancel Location message to the source MME.

The version information about the source MME is provided by the source MME to the HSS in a previous step similar to Step s105. The HSS determines whether it is necessary to delete the information about the source MME according to the locally saved version information about the source MME, and if yes, Step s106 is performed.

In Step s107, the HSS inserts subscriber data into the target MME.

In Step s108, the target MME sends a TAU/RAU Accept message to the UE.

Figure 2:
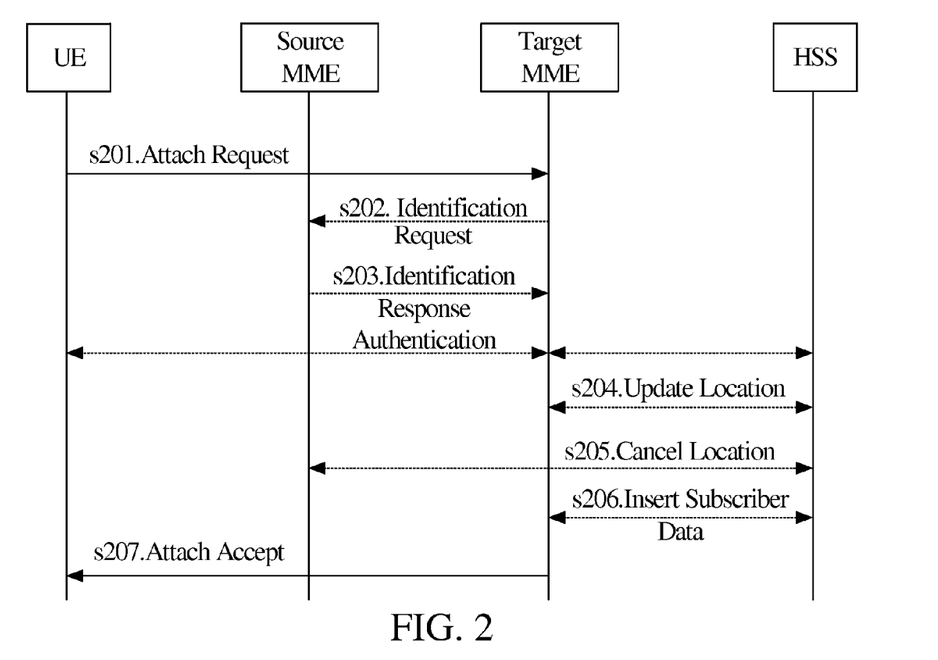
FIG. 2 is a flow chart of an MME information deleting method according to another embodiment of the present invention.

A second embodiment of the present invention provides an MME information deleting method. Referring to FIG. 2, an Attach process initiated by UE is implemented, which includes the following steps.

In Step s201, UE sends an Attach Request message to a target MME.

In Step s202, the target MME sends an Identification Request message to a source MME to require information about the UE.

In Step s203, the source MME sends an Identification Response message to the target MME to return the information about the UE.

In Step s204, the target MME sends an Update Location message to an HSS for registration, in which the message carries an IMSI, version information about the MME, and an MME identity. The version information carried in the message indicates the HSS whether the version of the current target MME is Pre-Rel-8, or explicitly informs the HSS of the version information about the target MME itself, for example, Rel-8. The HSS may save the version information about the target MME in the message. If the message does not carry an indication of the version information about the entity, the HSS sets the version information about the target MME to Pre-Rel-8.

At some time thereafter, if the UE continuously moves from the target MME (for ease of illustration, referred to as MME B) to another new MME (for ease of illustration, referred to as MME C) and initiates an Attach or a TAU/RAU process, after receiving an Update Location message from the new target MME C, the HSS determines whether it is necessary to delete location registration information about the MME B according to the locally saved version information about the source MME B and other information (for example, RAT), and if yes, the HSS sends a Cancel Location message to the MME B.

In Step s205, the HSS sends a Cancel Location message to the source MME.

The version information about the source MME is provided by the source MME to the HSS in a previous step similar to Step s204. The HSS determines whether it is necessary to delete the information about the source MME according to the locally saved version information about the source MME, and if yes, Step s205 is performed.

In Step s206, the HSS inserts subscriber data into the target MME.

In Step s207, the target MME sends an Attach Accept message to the UE.

Figure 3:
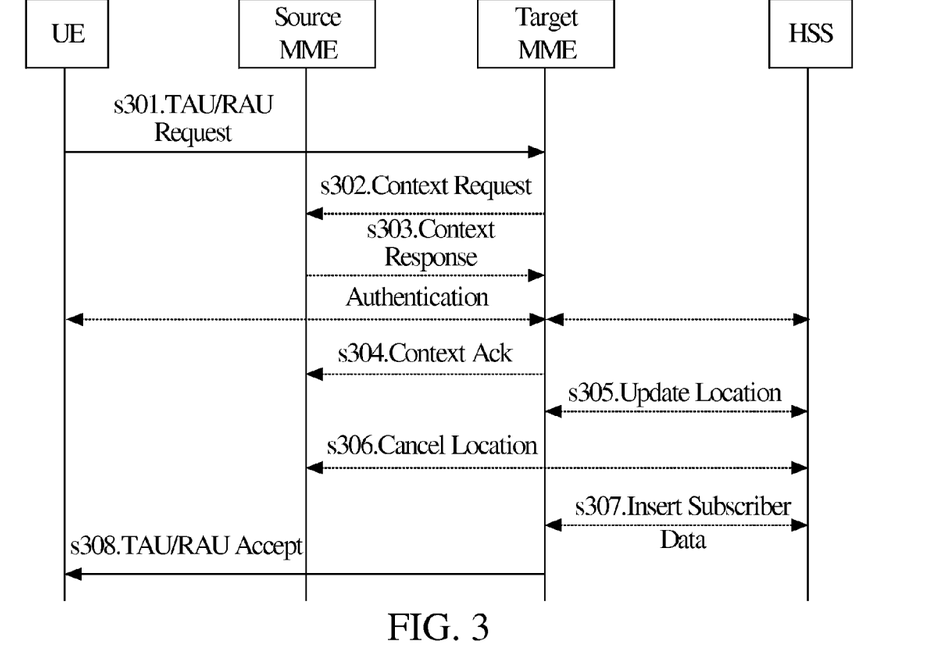
FIG. 3 is a flow chart of an MME information deleting method according to another embodiment of the present invention.

A third embodiment of the present invention provides an MME information deleting method. Referring to FIG. 3, a TAU/RAU process initiated by UE is implemented, which includes the following steps.

In Step s301, UE sends a TAU/RAU Request message to a target MME.

In Step s302, the target MME sends a Context Request message to a source MME to require context information about the UE.

In Step s303, the source MME sends a Context Response message to the target MME to return the context information about the UE.

Solution 1: The source MME sends a Context Response message that carries a cell-based release indicator indicating the target MME the version information about the source MME itself. The indication information indicates whether the version of the source MME is Pre-Rel-8 or specifically identifies the version of the source MME, for example, Rel-8. The target MME acquires the version information about the source MME according to the message. Alternatively, if the message sent by the source MME does not carry the indication of the version information about the entity, the target MME sets the version information about the source MME to Pre-Rel-8.

In Step s304, after receiving the context information about the UE, the target MME sends a Context Ack message to the source MME.

In Step s305, the target MME acquires the version information about the source MME during the interaction with the information about the source MME. Besides Solution 1, Solution 2 may also be employed, in which the target MME determines the version information about the source MME according to a GPRS Tunneling Protocol (GTP) version adopted in the interaction with the source MME.

The Update Location message sent by the target MME to the HSS carries the version information about the source MME. The information may be an indicator bit, indicating the HSS that the source MME is a Pre-Rel-8 MME or instructing the HSS to delete registration information about the source MME. After receiving the message, the HSS determines whether it is necessary to delete the registration information about the source MME according to the indication information and other information in the message (for example, RAT), and if yes, the HSS sends a Cancel Location message to the source MME.

In Step s306, the HSS sends a Cancel Location message to the source MME.

In Step s307, the HSS inserts subscriber data into the target MME.

In Step s308, the target MME sends a TAU/RAU Accept message to the UE.

Figure 4:
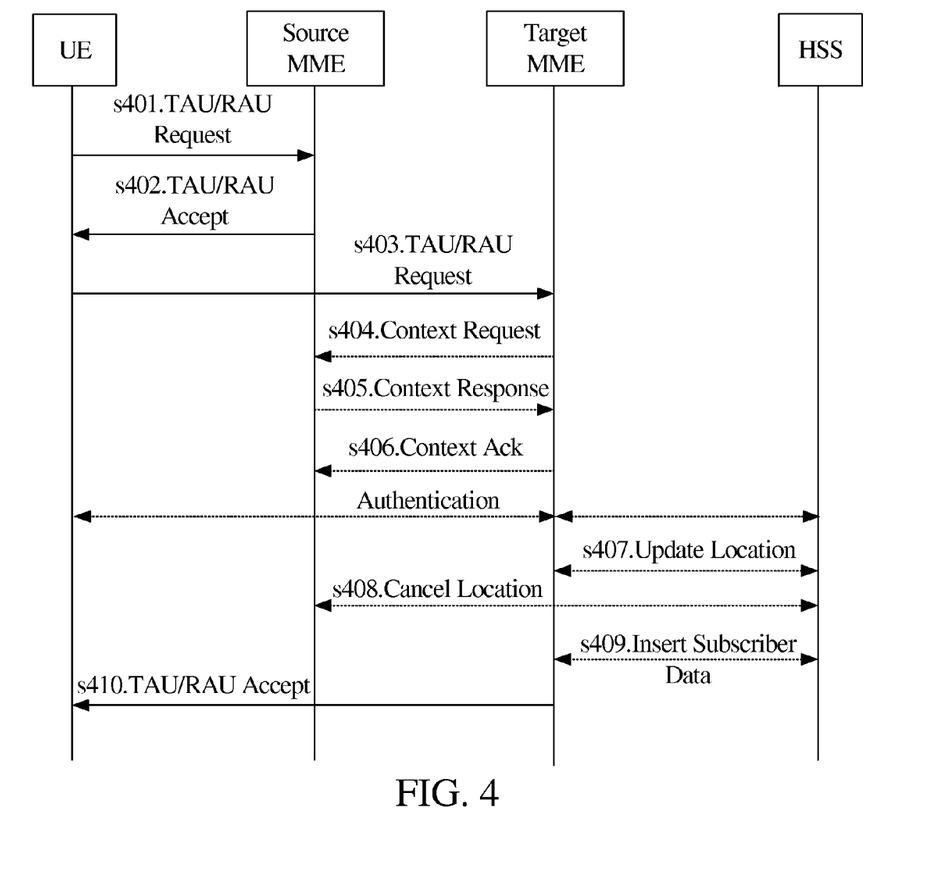
FIG. 4 is a flow chart of an MME information deleting method according to another embodiment of the present invention.

A fourth embodiment of the present invention provides an MME information deleting method. Referring to FIG. 4, a TAU/RAU process initiated by UE is implemented, which includes the following steps.

In Step s401, UE sends a TAU/RAU Request message to a source MME.

In Step s402, the source MME sends a TAU/RAU Accept message to the UE, and the message carries a release indicator. The source MME carries a release indicator in the TAU/RAU Accept message to inform the UE of the current version information about the source MME, for example, Rel-8. After receiving the message, the UE saves the version information about the source MME, and if the UE does not receive the release indicator, the version of the source MME is set to Pre-Rel-8.

In Step s403, the UE moves from a coverage area of the source MME to a coverage area of the target MME, and sends a TAU/RAU Request message to the target MME, in which the message carries a release indicator. The release indicator identifies the version information about the source MME. Specifically, the information may be an indication that instructs the target MME to send an Update Location message to the HSS and instructs the HSS to delete the registration information about the source MME. The information may also be specific version information that indicates the target MME the version information about the source MME, for example, Rel-8.

In Step s404, the target MME sends a Context Request message to the source MME to require context information about the UE.

In Step s405, the source MME sends a Context Response message to the target MME to return the context information about the UE.

In Step s406, after receiving the context information about the UE, the target MME sends a Context Ack message to the source MME.

In Step s407, the target MME sends an Update Location message to the HSS, and carries an indicator bit of release indicator in the Update Location message according to the indication information in the TAU/RAU Request sent by the UE. Specifically, when the indication information sent by the UE is the version information about the source MME, the target MME notifies the HSS of the version information about the source MME through the indicator bit of release indicator; or when it is figured out that the source MME is a Pre-Rel-8 MME according to the indication information sent by the UE, the target MME instructs the HSS to delete the registration information about the source MME through the indicator bit of release indicator. Alternatively, when the target MME transparently transmits the indication information about the UE to the HSS, after receiving the message, the HSS determines whether it is necessary to delete the registration information about the source MME according to the indication information and other information in the message (for example, RAT), and sends a Cancel Location message to the source MME.

In Step s408, the HSS sends a Cancel Location message to the source MME.

In Step s409, the HSS inserts subscriber data into the target MME.

In Step s410, the target MME sends a TAU/RAU Accept message to the UE, and the message carries a release indicator. The release indicator indicates the UE the version information about the target MME. Specifically, the information may be version information about the target MME, for example, Rel-8, or an indication of, for example, whether the version of the target MME is Pre-Rel-8.

Figure 5:
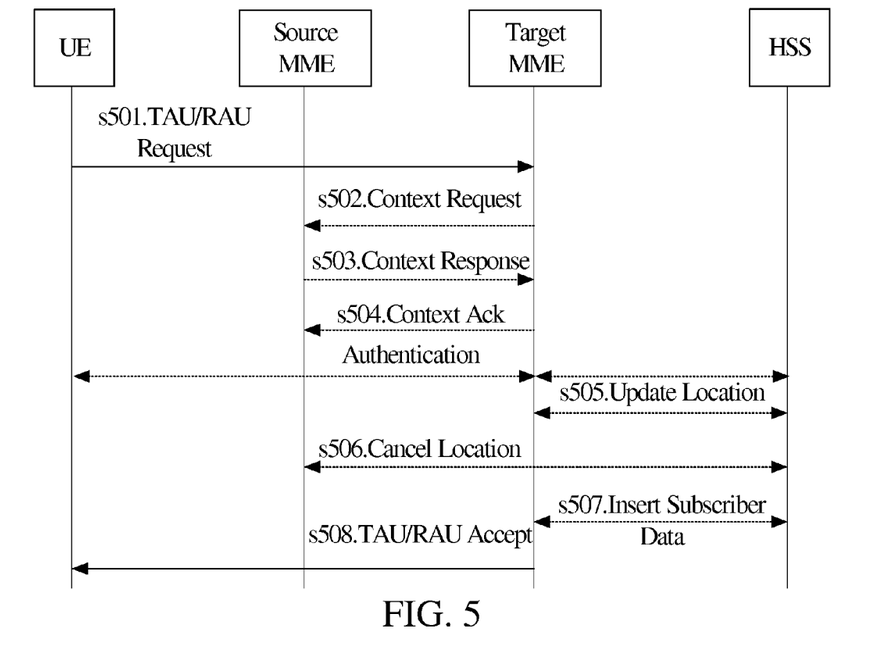
FIG. 5 is a flow chart of an MME information deleting method according to a fifth embodiment of the present invention.

A fifth embodiment of the present invention provides an MME information deleting method. Referring to FIG. 5, a TAU/RAU process initiated by UE is implemented, which includes the following steps.

In Step s501, UE sends a TAU/RAU Request message to a target MME.

In Step s502, the target MME sends a Context Request message to a source MME to require context information about the UE.

In Step s503, the source MME sends a Context Response message to the target MME to return the context information about the UE.

In Step s504, the target MME sends a Context Ack message to the source MME.

In Step s505, the target MME sends an Update Location message to an HSS for registration, in which the message carries an IMSI and an MME identity. After receiving the Update Location message sent by the target MME, the HSS determines the version of the current target MME according to the protocol type or protocol version adopted in the message, and saves the version information about the entity.

At some time thereafter, if the UE continuously moves from the target MME (for ease of illustration, referred to as MME B) to another new MME (for ease of illustration, referred to as MME C) (for ease of illustration, referred to as MME C) and initiates an Attach or a TAU/RAU process, after receiving an Update Location message from the new target MME C, the HSS determines whether it is necessary to delete location registration information about the MME B according to the locally saved version information about the source MME B and other information (for example, RAT), and if yes, the HSS sends a Cancel Location message to the MME B.

In Step s506, the HSS sends a Cancel Location message to the source MME and interacts with the source MME to cancel the registration.

The version information about the source MME is provided by the source MME to the HSS in a previous step similar to Step s505. The HSS determines whether it is necessary to delete the information about the source MME according to the locally saved version information about the source MME, and if yes, Step s506 is performed.

In Step s507, the HSS interacts with the target MME and inserts subscriber data into the target MME.

In Step s508, the target MME sends a TAU/RAU Accept message to the UE.

Figure 6:
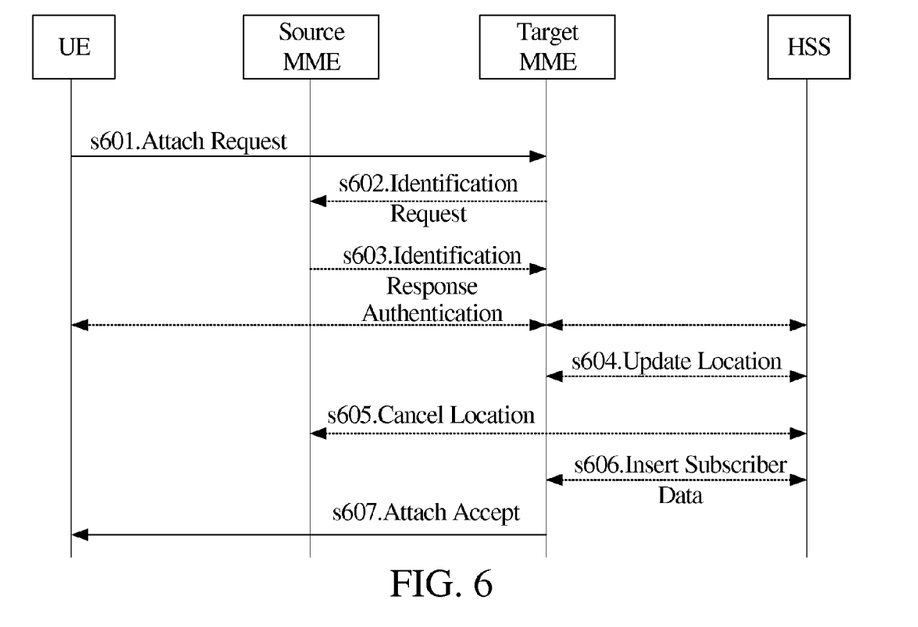
FIG. 6 is a flow chart of an MME information deleting method according to another embodiment of the present invention.

A sixth embodiment of the present invention provides an MME information deleting method. Referring to FIG. 6, an Attach process initiated by UE is implemented, which includes the following steps.

In Step s601, UE sends an Attach Request message to a target MME.

In Step s602, the target MME sends an Identification Request message to a source MME to require information about the UE.

In Step s603, the source MME sends an Identification Response message to the target MME to return the information about the UE.

In Step s604, the target MME sends an Update Location message to an HSS for registration, in which the message carries an IMSI and an MME identity. After receiving the Update Location message from the target MME, the HSS determines the version of the current source MME according to the protocol type or protocol version adopted in the message, and saves the version information about the entity.

At some time thereafter, if the UE continuously moves from the target MME (for ease of illustration, referred to as MME B) to another new MME (for ease of illustration, referred to as MME C) (for ease of illustration, referred to as MME C) and initiates an Attach or a TAU/RAU process, after receiving the Update Location message from the new target MME C, the HSS determines whether it is necessary to delete location registration information about the MME B according to the locally saved version information about the source MME B and other information (for example, RAT), and if yes, the HSS sends a Cancel Location message to the MME B.

In Step s605, the HSS sends a Cancel Location message to the source MME and interacts with the source MME to cancel the registration.

The version information about the source MME is provided by the source MME to the HSS in a previous step similar to Step s604. The HSS determines whether it is necessary to delete the information about the source MME according to the locally saved version information about the source MME, and if yes, Step s605 is performed.

In Step s606, the HSS interacts with the target MME and inserts subscriber data into the target MME.

In Step s607, the target MME sends an Attach Accept message to the UE.

Figure 7:
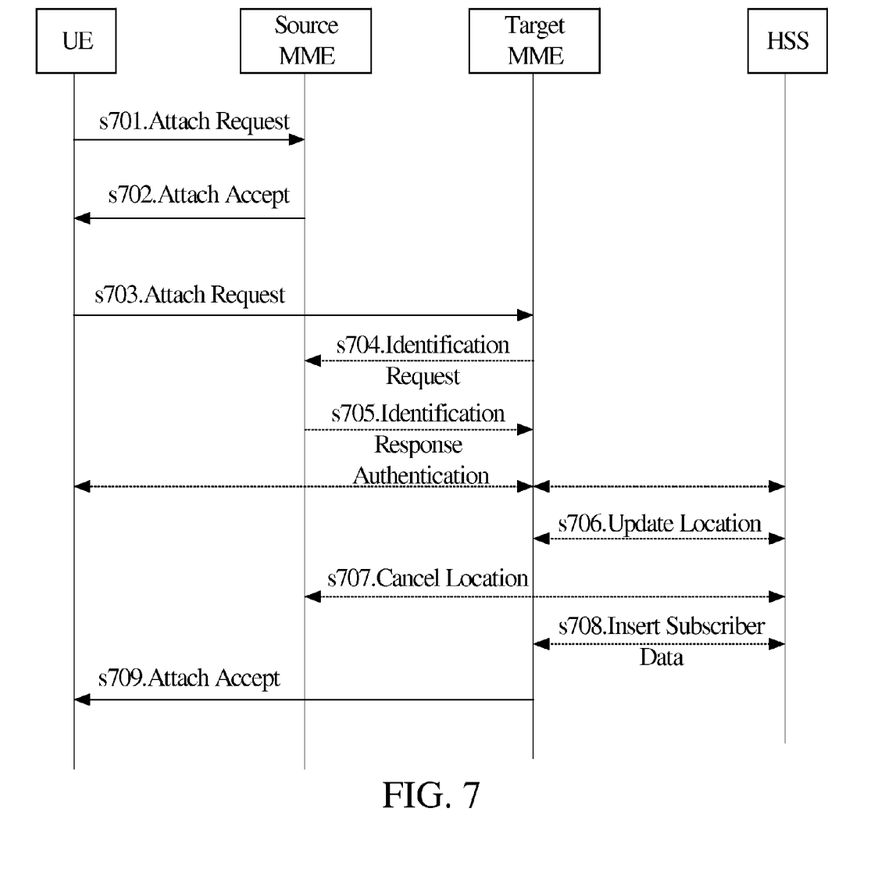
FIG. 7 is a flow chart of an MME information deleting method according to another embodiment of the present invention.

A seventh embodiment of the present invention provides an MME information deleting method. Referring to FIG. 7, an Attach process initiated by UE is implemented, which includes the following steps.

In Step s701, UE sends an Attach Request message to a source MME.

In Step s702, the source MME sends an Attach Accept message to the UE, and the message carries a release indicator.

Solution 1: The source MME carries a release indicator in the Attach Accept message to inform the UE of the version information about the current source MME. After receiving the message, the UE saves the version information about the source MME, and if the UE does not receive the release indicator, the version of the source MME is set to Pre-Rel-8.

In Step s703, the UE moves from a coverage area of the source MME to a coverage area of the target MME, and sends an Attach Request message to the target MME, in which the message carries a release indicator. The UE carries a temporary identity and version information about the source MME. The release indicator identifies the version information about the source MME. Specifically, the information may be an indication that instructs the target MME to send an Update Location message to the HSS and instructs the HSS to delete the registration information about the source MME. The information may also be specific version information, indicating the target MME that the version of the source MME is Pre-Rel-8. After receiving the indication information, the target MME carries an indication of notifying the HSS to delete the information about the source MME in Step s706.

In Step s704, the target MME sends an Identification Request message to the source MME to require information about the UE.

In Step s705, the source MME sends an Identification Response message to the target MME to return the information about the UE.

Solution 2: The target MME acquires the version information about the source MME during the interaction with the information about the source MME. Specifically, the target MME acquires the version information about the source MME according to a GTP version adopted in the message, or the source MME notifies the target MME of the version information about the source MME itself in the Identification Response message. If the target MME does not receive the version information about the source MME, the version of the source MME is defaulted to Pre-Rel-8.

In Step s706, the target MME sends an Update Location message to the HSS, and the message carries the version information about the source MME.

The target MME sends an Update Location message to the HSS, and the message carries the version information about the source MME. The information may be an indicator bit that notifies the HSS that the source MME is a Pre-Rel-8 MME or instructs the HSS to delete the registration information about the source MME. After receiving the message, the HSS determines whether it is necessary to delete the registration information about the source MME according to the indication information and other information in the message (for example, RAT), and if yes, the HSS sends a Cancel Location message to the source MME.

In Step s707, the HSS sends a Cancel Location message to the source MME and interacts with the source MME to cancel the registration.

In Step s708, the HSS interacts with the target MME and inserts subscriber data into the target MME.

In Step s709, the target MME sends an Attach Accept message to the UE, in which the message carries a release indicator, indicating the UE the version information about the target MME.

Figure 8:
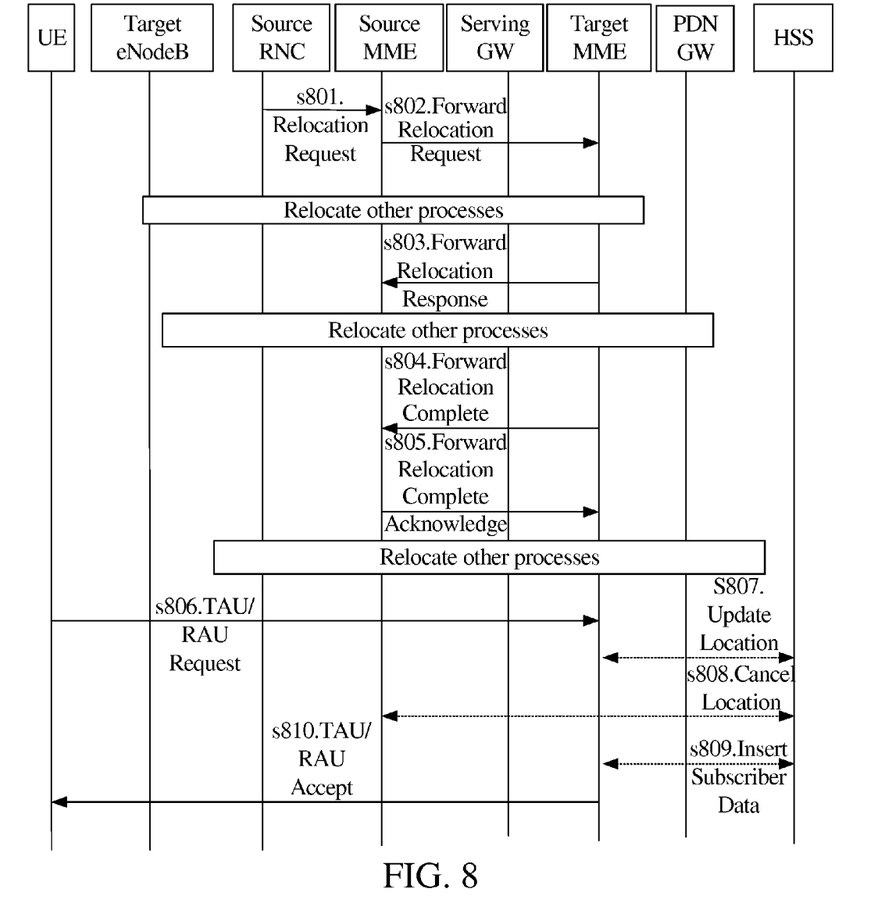
FIG. 8 is a flow chart of an MME information deleting method according to another embodiment of the present invention.

An eighth embodiment of the present invention provides an MME information deleting method. Referring to FIG. 8, a Handover process is implemented, which includes the following steps.

In Step s801, a source eNodeB sends a Relocation Request to a source MME.

In Step s802, the source MME sends a Forward Relocation Request message to a target MME.

Solution 1: The source MME adds a release indicator in the message to notify the target MME of the version information about the source MME itself or indicate the target MME whether the version of the source MME is Pre-Rel-8. If the target MME does not receive the version information about the source MME, the version of the source MME is defaulted to Pre-Rel-8.

In Step s803, the target MME sends a Forward Relocation Response message to the source MME.

In Step s804, after the relocation is completed, the target MME sends a Forward Relocation Complete message to the source MME.

In Step s805, after receiving the message, the source MME sends a Forward Relocation Complete Acknowledge message to the target MME.

In Step s806, the UE sends a TAU/RAU Request message to the target MME.

In Step s807, the target MME acquires the version information about the source MME during the interaction with the information about the source MME. Besides Solution 1 in Step s802, Solution 2 may also be employed, in which the target MME determines the version information about the source MME according to a GTP version adopted in the interaction with the source MME. The target MME sends an Update Location message to the HSS, and the message carries the version information about the source MME. The information may be an indicator bit of release indicator that notifies the HSS that the source MME is a Pre-Rel-8 MME or instructs the HSS to delete the registration information about the source MME. After receiving the message, the HSS determines whether it is necessary to delete the registration information about the source MME according to the indication information and other information in the message (for example, RAT), and if yes, the HSS sends a Cancel Location message to the source MME.

In Step s808, the HSS sends a Cancel Location message to the source MME and interacts with the source MME to delete the registration information.

In Step s809, the HSS interacts with the target MME and inserts subscriber data into the target MME.

In Step s810, the target MME sends a TAU/RAU Accept message to the UE.

According to the embodiments of the present invention, through the method that the MME initiatively provides its version information to the network side related device, such as the HSS, or transmits the version information about the source MME to the network side related device, such as the HSS, or transmits the indication of deleting the information about the source MME to the network side related device, such as the HSS, the network side related device, such as the HSS, is enabled to determine whether it is necessary to delete the registration information about the MME.

Figure 9:
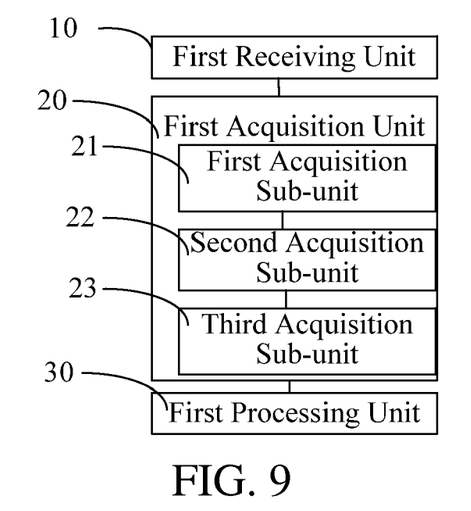
FIG. 9 is a schematic structural view of a network device according to an embodiment of the present invention.

One embodiment of the present invention also provides a network device for deleting MME information, and the network device may be an HSS. Referring to FIG. 9, the network device includes a first receiving unit 10, a first acquisition unit 20, and a first processing unit 30.

The first receiving unit 10 is adapted to receive a message sent by a first MME.

The first acquisition unit 20 is adapted to acquire version information about the first MME according to the message received by the first receiving unit 10.

The first processing unit 30 is adapted to determine whether it is necessary to delete information about the first MME according to the version information about the first MME acquired by the first acquisition unit 20 when it is detected that a user terminal moves from the first MME to a second MME.

Specifically, the first acquisition unit 20 further includes a first acquisition sub-unit 21, a second acquisition sub-unit 22, or a third acquisition sub-unit 23.

The first acquisition sub-unit 21 is adapted to acquire version information about the MME according to an indication of the version information carried in the message.

The second acquisition sub-unit 22 is adapted to acquire version information about the MME according to a pre-set default when an Update Location message does not carry an indication of the version information.

The third acquisition sub-unit 23 is adapted to acquire version information about the MME according a version of the message sent by the MME.

Figure 10:
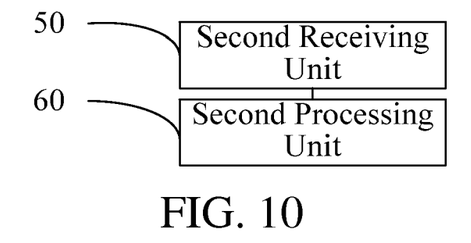
FIG. 10 is a schematic structural view of a network device according to an embodiment of the present invention.

One embodiment of the present invention also provides a network device for deleting the MME information, and the network device may be an HSS. Referring to FIG. 10, the network device includes a second receiving unit 50 and a second processing unit 60.

The second receiving unit 50 is adapted to receive a message sent by a target MME. The message carries version information about a source MME acquired by the target MME or an indication of deleting information about the source MME added by the target MME.

The second processing unit 60 is adapted to delete the information about the source MME according to the message sent by the target MME and received by the second receiving unit 50.

Figure 11:
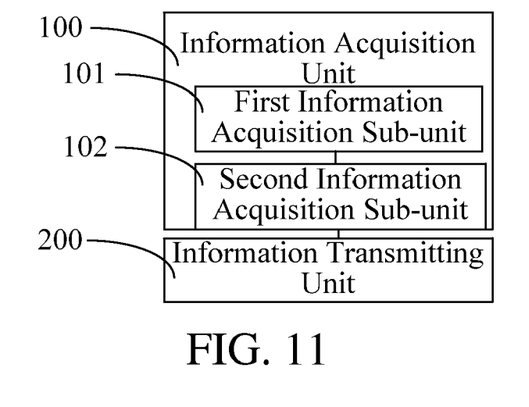
FIG. 11 is a schematic structural view of an MME device according to an embodiment of the present invention.

One embodiment of the present invention further provides an MME device, which may be an MME or SGSN. Referring to FIG. 11, the MME device serves as a target MME, and includes an information acquisition unit 100 and an information transmitting unit 200.

The information acquisition unit 100 is adapted to acquire version information about a source MME or an indication of deleting information about the source MME.

The information transmitting unit 200 is adapted to add the version information about the source MME acquired by the information acquisition unit 100 in a message and send the message to a network side related device, or add the indication of deleting the information about the source MME acquired by the information acquisition unit 100 in a message and send the message to a network side related device.

The information acquisition unit 100 further includes a first information acquisition sub-unit 101 and a second information acquisition sub-unit 102.

The first information acquisition sub-unit 101 is adapted to acquire version information about the source MME according to a message sent by the source MME, or a version of a message used when performing message interaction with the source MME, or a message sent by a user terminal when moving from the source MME to the target MME.

The second information acquisition sub-unit 102 is adapted to determine whether it is necessary to delete information about the source MME according to the version information about the source MME acquired by the first information acquisition sub-unit 101 or according to an indication of deleting the information about the source MME sent by the user terminal.

According to the embodiments of the present invention, through the method that the MME initiatively provides its version information to the network side related device, such as the HSS, or transmits the version information about the source MME to the network side related device, such as the HSS, or transmits the indication of deleting the information about the source MME to the network side related device, such as the HSS, the network side related device, such as the HSS, is enabled to determine whether it is necessary to delete the registration information about the MME.

Through the above description of the embodiments, it is apparent to persons skilled in the art that the present invention may be accomplished by hardware, and definitely may also be accomplished by software on a necessary universal hardware platform. Therefore, the technical solutions of the present invention may be embodied in the form of a software product. The software product may be stored in a nonvolatile storage medium (for example, CD-ROM, USB flash drive, or removable hard disk) and contain several instructions adapted to instruct a computer equipment (for example, a personal computer, a server, or network equipment) to perform the method as described in the embodiments of the present invention.

The above descriptions are merely preferred embodiments of the present invention, but not intended to limit the present invention.

What is claimed is:

1. A method for deleting information of a mobility management entity (MME), comprising:
    receiving, by a home subscriber server (HSS), a first message sent by a target MME, wherein the first message carries an indication of deleting the information about a source MME; and
    deleting, by the HSS, the information about the source MME according to the first message sent by the target MME;
    wherein the indication of deleting the information about the source MME is added in the first message by the target MME after the target MME receives a second message sent by the source MME, acquires version information of the source MME indicated by the second message, and determines the information which is to be deleted about the source MME according to the version information of the source MME; and
    wherein the version information of the source MME indicates a version of the source MME.

2. The method according to claim 1, wherein the version information of the source MME indicates the source MME is a legacy MME.

3. The method according to claim 2, wherein the legacy MME is a Serving GPRS Support Node (SGSN).

4. The method according to claim 1, wherein the first message further triggers the HSS to send a cancel location message to the source MME, according to the indication of deleting the information about the source MME in the first message.

5. The method according to claim 1, wherein the version information of the source MME is indicated by a version of the second message.

6. A network device, for deleting information of a mobility management entity (MME), comprising:
    a receiver, configured to receive a first message sent by a target MME, wherein the first message carries an indication of deleting the information about a source MME; and
    a processor, configured to delete the information about the source MME according to the first message sent by the target MME;
    wherein the indication of deleting the information about the source MME is added in the first message by the target MME after the target MME receives a second message sent by the source MME, acquires version information of the source MME indicated by the second message, and determines the information which is to be deleted about the source MME according to the version information of the source MME; and
    wherein the version information of the source MME indicates a version of the source MME.

7. The network device according to claim 6, wherein the version information of the source MME indicates the source MME is a legacy MME.

8. The network device according to claim 7, wherein the legacy MME is a Serving GPRS Support Node (SGSN).

9. The network device according to claim 6, wherein the version information of the source MME is indicated by a version of the second message.

10. The network device according to claim 6, further comprising a transmitter configured to send a cancel location message to the source MME according to the indication of deleting the information about the source MME in the first message.

11. A communication system comprising a home subscriber server (HSS) and a target mobility management entity (MME), wherein:
    the target MME is configured to receive a first message sent by a source MME, acquire version information of the source MME indicated by the first message; determine information which is to be deleted about the source MME according to the version information of the source MME; add an indication of deleting the information about the source MME in a second message, and send the second message to the HSS;
    the HSS is configured to receive the second message sent by the target MME, and delete the information about the source MME according to the second message; and wherein the version information of the source MME indicates a version of the source MME.

12. The communication system according to claim 11, wherein the version information of the source MME indicates the source MME is a legacy MME.

13. The communication system according to claim 12, wherein the legacy MME is a Serving GPRS Support Node (SGSN).

14. The communication system according to claim 11, wherein the version information of the source MME is indicated by a version of the first message.

15. The communication system according to claim 11, the HSS is further configured to send a cancel location message to the source MME according to the indication of deleting the information about the source MME in the second message.

* * * * *